(12) United States Patent
Gangam et al.

(10) Patent No.: US 9,489,240 B2
(45) Date of Patent: Nov. 8, 2016

(54) RESOURCE MANAGEMENT IN A MULTI-OPERATING ENVIRONMENT

(71) Applicant: Google Technology Holdings, LLC, Mountain View, CA (US)

(72) Inventors: Vamshika R Gangam, San Jose, CA (US); Josh D Galicia, Cary, IL (US); Su-Yin Gan, Santa Clara, CA (US)

(73) Assignee: GOOGLE TECHNOLOGY HOLDINGS LLC, Mountain View, CA (US)

( * ) Notice: Subject to any disclaimer, the term of this patent is extended or adjusted under 35 U.S.C. 154(b) by 0 days.

(21) Appl. No.: 14/617,024

(22) Filed: Feb. 9, 2015

(65) Prior Publication Data
US 2015/0154053 A1   Jun. 4, 2015

Related U.S. Application Data

(62) Division of application No. 13/052,514, filed on Mar. 21, 2011, now Pat. No. 8,983,536.

(60) Provisional application No. 61/405,894, filed on Oct. 22, 2010.

(51) Int. Cl.
*G06F 9/54* (2006.01)
*G06F 9/50* (2006.01)
(Continued)

(52) U.S. Cl.
CPC .............. *G06F 9/5011* (2013.01); *G06F 9/485* (2013.01); *G06F 9/5022* (2013.01); *G06F 9/54* (2013.01); *G06F 11/3037* (2013.01); *G06F 11/32* (2013.01)

(58) Field of Classification Search
None
See application file for complete search history.

(56) References Cited

U.S. PATENT DOCUMENTS 6,167,425 A   12/2000   Beckhoff et al.
6,178,503 B1   1/2001   Madden et al.
(Continued)

FOREIGN PATENT DOCUMENTS

CN   101149685 A   3/2008
EP   1467282 A2   10/2004
(Continued)

OTHER PUBLICATIONS

Patent Cooperation Treaty, International Search Report and Written Opinion of the International Searching Authority for International Application No. PCT/US2011/051904, Apr. 4, 2012, 20 pages.
(Continued)

*Primary Examiner* — H S Sough
*Assistant Examiner* — Abdou Seye
(74) *Attorney, Agent, or Firm* — Morris & Kamlay LLP

(57) ABSTRACT

A method for providing user access to telephony operations in a multi operating environment having memory resources nearly depleted that include determining whether a predetermined first memory threshold of a computing environment has been reached and displaying a user interface corresponding to memory usage; and determining whether a predetermined second memory threshold, greater than the first, of the computing environment has been reached. Restricting computing functionality and allowing user access for telephony operations, corresponding to a mobile device, when the second memory threshold is reached is included as well. Also included is maintaining the computing restriction until the memory usage returns below the second memory threshold.

14 Claims, 7 Drawing Sheets

(51) Int. Cl.
*G06F 9/48* (2006.01)
*G06F 11/30* (2006.01)
*G06F 11/32* (2006.01)

(56) References Cited

U.S. PATENT DOCUMENTS

| | | |
|---|---|---|
| 6,336,120 B1 | 1/2002 | Noddings et al. |
| 6,460,136 B1 | 10/2002 | Krohmer et al. |
| 6,691,146 B1 | 2/2004 | Armstrong et al. |
| 7,158,154 B2 | 1/2007 | Kim et al. |
| 7,328,333 B2 | 2/2008 | Kawano et al. |
| 7,376,949 B2 | 5/2008 | Lowell et al. |
| 7,424,601 B2 | 9/2008 | Xu |
| 7,424,623 B2 | 9/2008 | Du et al. |
| 7,461,144 B1 | 12/2008 | Beloussov et al. |
| 7,529,921 B2 | 5/2009 | Stein et al. |
| 7,536,537 B2 | 5/2009 | Linn et al. |
| 7,634,770 B2 | 12/2009 | Roth et al. |
| 7,636,586 B2 | 12/2009 | Maaniitty et al. |
| 7,689,820 B2 | 3/2010 | Pierce et al. |
| 7,783,665 B1 | 8/2010 | Tormasov et al. |
| 8,056,081 B2 * | 11/2011 | Mathur et al. ............ 718/104 |
| 8,195,624 B2 | 6/2012 | Yang |
| 8,352,733 B2 | 1/2013 | Mantere et al. |
| 8,392,498 B2 | 3/2013 | Wikars et al. |
| 8,589,952 B2 | 11/2013 | Crowley et al. |
| 8,615,589 B1 | 12/2013 | Ashiabor et al. |
| 8,819,705 B2 * | 8/2014 | Reeves et al. ............ 719/318 |
| 8,868,899 B2 | 10/2014 | Galicia et al. |
| 8,898,443 B2 | 11/2014 | Reeves et al. |
| 2002/0151334 A1 | 10/2002 | Sharma et al. |
| 2003/0065738 A1 | 4/2003 | Yang et al. |
| 2003/0135771 A1 | 7/2003 | Cupps et al. |
| 2003/0204708 A1 | 10/2003 | Hulme et al. |
| 2003/0221087 A1 | 11/2003 | Nagasaka et al. |
| 2004/0039862 A1 | 2/2004 | Hunt et al. |
| 2004/0095388 A1 | 5/2004 | Rocchetti et al. |
| 2004/0207508 A1 | 10/2004 | Lin et al. |
| 2005/0108297 A1 | 5/2005 | Rollin et al. |
| 2005/0227692 A1 | 10/2005 | Kawashima et al. |
| 2005/0229188 A1 | 10/2005 | Schneider et al. |
| 2005/0246505 A1 | 11/2005 | McKenney et al. |
| 2006/0010314 A1 | 1/2006 | Xu et al. |
| 2006/0010446 A1 | 1/2006 | Desai et al. |
| 2006/0046706 A1 | 3/2006 | Lin et al. |
| 2006/0106958 A1 | 5/2006 | Khawand et al. |
| 2007/0050765 A1 | 3/2007 | Geisinger et al. |
| 2007/0135043 A1 | 6/2007 | Hayes et al. |
| 2007/0136402 A1 * | 6/2007 | Grose et al. ............ 707/206 |
| 2007/0171921 A1 | 7/2007 | Wookey et al. |
| 2007/0266231 A1 | 11/2007 | Chua et al. |
| 2007/0283147 A1 | 12/2007 | Fried et al. |
| 2007/0288941 A1 | 12/2007 | Dunshea et al. |
| 2007/0294689 A1 | 12/2007 | Garney et al. |
| 2008/0100568 A1 | 5/2008 | Koch et al. |
| 2008/0168235 A1 * | 7/2008 | Watson et al. ............ 711/135 |
| 2008/0307425 A1 | 12/2008 | Tripathi et al. |
| 2009/0031329 A1 | 1/2009 | Kim et al. |
| 2009/0037909 A1 | 2/2009 | Xu et al. |
| 2009/0063845 A1 | 3/2009 | Lin et al. |
| 2009/0064186 A1 | 3/2009 | Lin et al. |
| 2009/0080562 A1 | 3/2009 | Franson et al. |
| 2009/0089569 A1 | 4/2009 | Baribault et al. |
| 2009/0100425 A1 | 4/2009 | Russell et al. |
| 2009/0287571 A1 | 11/2009 | Fujioka et al. |
| 2009/0327917 A1 | 12/2009 | Aaron et al. |
| 2010/0031348 A1 | 2/2010 | Lam et al. |
| 2010/0082321 A1 | 4/2010 | Cherkasova et al. |
| 2010/0083248 A1 | 4/2010 | Wood et al. |
| 2010/0146513 A1 | 6/2010 | Song et al. |
| 2010/0211769 A1 | 8/2010 | Shankar et al. |
| 2011/0016299 A1 | 1/2011 | Galicia et al. |
| 2011/0016301 A1 | 1/2011 | Galicia et al. |
| 2011/0093691 A1 | 4/2011 | Galicia et al. |
| 2011/0093836 A1 | 4/2011 | Galicia et al. |
| 2011/0099403 A1 | 4/2011 | Miyata et al. |
| 2011/0119610 A1 | 5/2011 | Hackborn et al. |
| 2011/0126216 A1 | 5/2011 | Galicia et al. |
| 2011/0167421 A1 | 7/2011 | Soundararajan et al. |
| 2011/0283291 A1 | 11/2011 | Tobe et al. |
| 2012/0036450 A1 | 2/2012 | Canton et al. |
| 2012/0042159 A1 | 2/2012 | Liu et al. |
| 2012/0083264 A1 | 4/2012 | Ramasamy et al. |
| 2012/0084542 A1 | 4/2012 | Reeves et al. |
| 2012/0084791 A1 | 4/2012 | Benedek et al. |
| 2012/0102495 A1 | 4/2012 | Gangam et al. |
| 2012/0150970 A1 | 6/2012 | Peterson et al. |
| 2012/0173741 A1 | 7/2012 | Brittain et al. |
| 2012/0173986 A1 | 7/2012 | Jung et al. |
| 2012/0233611 A1 | 9/2012 | Voccio et al. |
| 2013/0111163 A1 | 5/2013 | Yang et al. |
| 2013/0198367 A1 | 8/2013 | Abraham et al. |
| 2013/0212283 A1 | 8/2013 | Wang et al. |

FOREIGN PATENT DOCUMENTS

| | | |
|---|---|---|
| GB | 2369959 A | 6/2002 |
| JP | 2009157802 A | 7/2009 |
| WO | 2007035611 A2 | 3/2007 |
| WO | 2009112896 A2 | 9/2009 |
| WO | 2009120598 A1 | 10/2009 |

OTHER PUBLICATIONS

Darcey, et al., "Introducing Android", Aug. 10, 2009, Retrieved from Internet: URL:http://media.techtarget.com/searchMobileComputing/downloads/IntroducingAndroid.pdf, on Mar. 26, 2012, pp. 1-29.

Zupeng, "MemoryUp Pro User Manual—Mobile RAM Booster for Android", Apr. 29, 2009, Retrieved from the Internet: URL:http://www.emobistudio.com/download/memoryup android/MemoryUp%20Pro%20(Android%20Edition)%20USer%20Guide.pdf, retrieved on Mar. 26, 2012.

mozillaZine: "Moving your profile folder", http://web.archive.org/web/20100207172041/, http://kb.mozillazine.org/Moving_your_profile_folder, Jan. 29, 2010, retrieved from the Internet: URL:http://kb.mozillazine.org/Moving_your_profile_folder, retrieved on Dec. 1, 2015.

Patent Cooperation Treaty, International Search Report and Written Opinion of the International Searching Authority for International Application No. PCT/US2011/067737 (CS38280), Aug. 1, 2012, 16 Pages.

Patent Cooperation Treaty, International Search Report and Written Opinion of the International Searching Authority for International Application No. PCT/US2013/021370 (CS39204), Apr. 26, 2013, 11 pages.

Ubuntu from Wikipedia; http://en.wikipedia.org/wiki/ubuntu, Jun. 5, 2009, p. 12.

Ubuntu Mobile; http://en.wikipedia.org/wiki/ubuntu-mobile, Jun. 5, 2009, p. 2.

"An Overview of Virtulization Techniques", www.vitruatopia.com/index.php/AnOverview-of-Virtualization-Techniques, May 4, 2009, p. 4.

"Kernel (computing) from Wikipedia", http://en.wikipedia.org/wiki/Kernal, Jun. 5, 2009, p. 18.

"The Xen Team—Users' manual Xen v2.0 for x86", University of Cambridge, UK, Dec. 31, 2004, p. 56.

Baentsch, et al., "Mote Runner: A Multi-Language Virtual Machine for Small Embedded Devices", 2009 Third International Conference on Sensor Technologies and Applications, IEEE Piscataway, NJ, USA, 6118/2009, p. 10.

Casadevall, et al., "AndroidExecutionEnvironment", https://wiki.ubuntu.com/Specs/AndroidExecutionEnvironment, Apr. 28, 2009.

Hassan, "Ubiquitous Computing and Android", Third International Conference Digital Information Management 2008, IEEE, Piscataway, Nj, Usa, Nov. 13, 2008, p. 6.

Turner, "Introducing Android 1.5 NDK, Release 1", Jun. 25, 2009, p. 4.

(56) References Cited

OTHER PUBLICATIONS

United States Patent and Trademark Office, Advisory Action Before the Filing of an Appeal Brief for U.S. Appl. No. 12/838,868, filed Oct. 21, 2013, p. 5.
United States Patent and Trademark Office, Non-Final Office Action for U.S. Appl. No. 12/838,668, filed Oct. 9, 2013.
Galicia, et al., "System and Method for Switching Between Environments in a Multi-Environment Operating System", U.S. Appl. No. 12/839,069, filed Jul. 19, 2010.
United States Patent and Trademark Office, Non-Final Office Action for U.S. Appl. No. 12/983,908, filed Dec. 4, 2013, p. 9.
PCT Search Report and Written Opinion of the International Searching Authority for International Application No. PCT/US2010/042523, Feb. 21, 2013, p. 12.
United States Patent and Trademark Office, Non Final Rejection Office Action for U.S Appl. No. 12/838,868, filed Feb. 25, 2014, p. 9.
United States Patent and Trademark Office, Non-Final Office Action for U.S. Appl. No. 12/838,984, filed Mar. 28, 2013, p. 16.
PCT Search Report and Written Opinion of the International Searching Authority for International Application No. PCT/US2012/020081, May 22, 2012, p. 10.
United States Patent and Trademark Office, Final Rejection Office Action for U.S. Appl. No. 12/838,868, filed May 8, 2013, p. 10.
PCT Search Report and Written Opinion of the International Search Authority for International Application No. PCT/US2010/042516, Jul. 11, 2011, p. 9.
"Multi-Environment Operating System", U.S. Appl. No. 12/838,868, filed Jul. 19, 2010, p. 28.
"Multi-Environment Operating System", U.S. Appl. No. 12/838,984, filed Jul. 19, 2010, p. 43.
"Multi-Environment Operating System", U.S. Appl. No. 12/839,193, filed Jul. 19, 2010, p. 48.
"System and Method for Initiating a Multi-Environment Operating System", U.S. Appl. No. 12/838,668, filed Jul. 19, 2010, p. 29.
"PCT Invitation to Pay Additional Fees and, Where Applicable, Protest Fee", International Application No. PCT/US2010/042526, Jun. 24, 2011, p. 7.
The State Intellectual Property Office of the People's Republic of China, Notification of First Office Action Chinese Patent Application No. 201080032324.3, Dec. 26, 2013, p. 18.

* cited by examiner

RESOURCE MANAGEMENT IN A MULTI-OPERATING ENVIRONMENT

This is a nonprovisional application claiming the benefit of provisional application, 61/405,894, filed Oct. 22, 2010 under 35 U.S.C. 119(e), whose contents are incorporated by reference herein in their entirety. This application is also a divisional application of U.S. application Ser. No. 13/052,514, filed Mar. 21, 2011, the disclosure of which is incorporated by reference in its entirety.

FIELD OF THE INVENTION

The present invention relates generally to sharing resources in multi-operating environments. More specifically, the present invention relates to monitoring and managing shared memory resources within a multi-operating environment that includes a mobile communication device.

BACKGROUND

New operational challenges arise when creating multi-operational environment devices (e.g. hardware devices that can include mobile and computing environments on a single device) including: (i) using the memory resources as efficiently as possible in all modes of operation; (ii) maintaining mobile communication or telephony stability and critical functionality while also using the computing environment.

Communication device operating instability can be seen in a multi-operating environment where resources such as memory are shared across the operating environments. Hardware devices can be docked or tethered or exist as peripheral devices during communication or operation within their respective operating environment.

Emulation systems that allow one operating system to control the devices have been thought of as managing resources efficiently. However, other resources such as processor usage are not efficiently handled.

More importantly is controlling the multi-operating environment under critical conditions such as extremely depleted memory resources.

DETAILED DESCRIPTION

Many consumers have experienced instable computing environments and have grown accustomed to dealing with "bugs" in their operating systems. In stark contrast, mobile communication environments are expected to be more robust than typical computing environments, because of the important function of communication on a as needed basis, for example in emergency situations or to give a person's whereabouts to concerned persons. Therefore, there is a challenging opportunity when a mobile communication operating environment is combined with a computing environment on a single platform or kernel. The following discussion describes a way to ensure that devices with these combined capabilities (e.g., mobile tablets/mobile telephones and desktop/laptop computing) remain at least as reliable as the typical mobile telephone.

While the specification concludes with claims defining features of the invention that are regarded as novel and unobvious, it is believed that the invention is better understood from a consideration of the description in conjunction with the drawings. As required, detailed embodiments of the present invention are disclosed herein. However, it is to be understood that the disclosed embodiments are merely exemplary of the invention, which can be embodied in various forms. Therefore, specific structural and functional details disclosed herein are not to be interpreted as limiting, but merely as basis for the claims and as a representative basis for teaching one skilled in the art to variously employ the present invention in virtually any appropriately detailed structure. Further, the terms and phrases used herein are not intended to be limiting, but rather to provide an understandable description of the invention.

Figure 1:
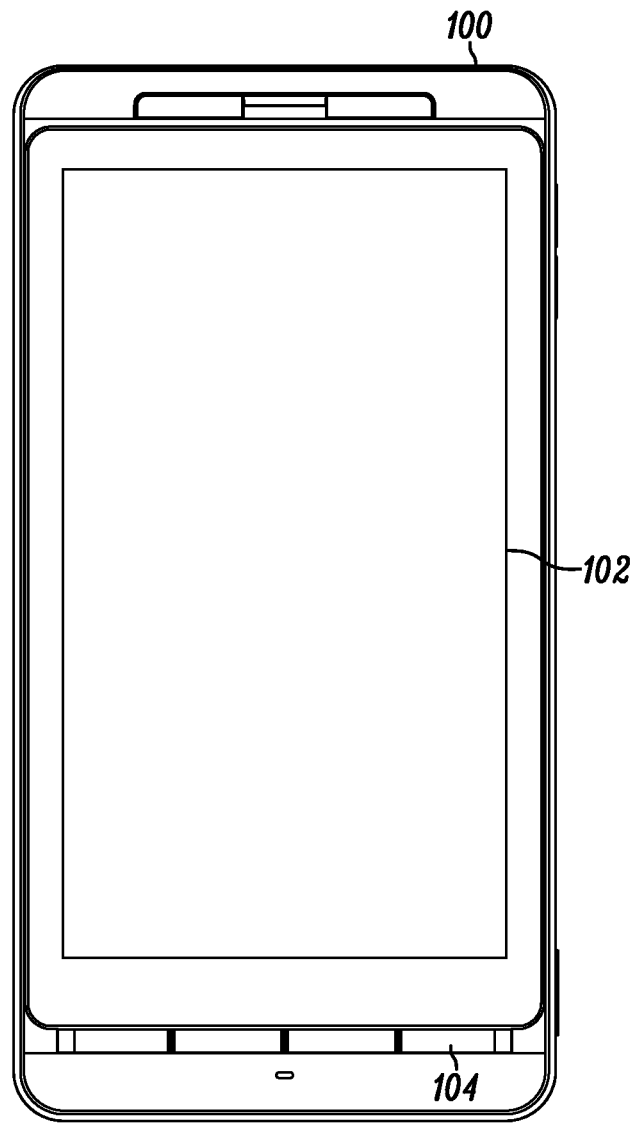
FIG. 1 is an exemplary perspective view of a mobile communication device.

Referring to FIG. 1, an exemplary mobile communication device 100, such as a mobile telephone is provided. A front view of mobile communication device 100 is shown in FIG. 1. Mobile device 100 includes an integrated touch panel 102, wherein the integrated touch panel 102 comprises a capacitive touch sensor and an electrophoretic display (EPD). Additionally, physical operational buttons 104 may be included on the mobile communication device.

Figure 2:
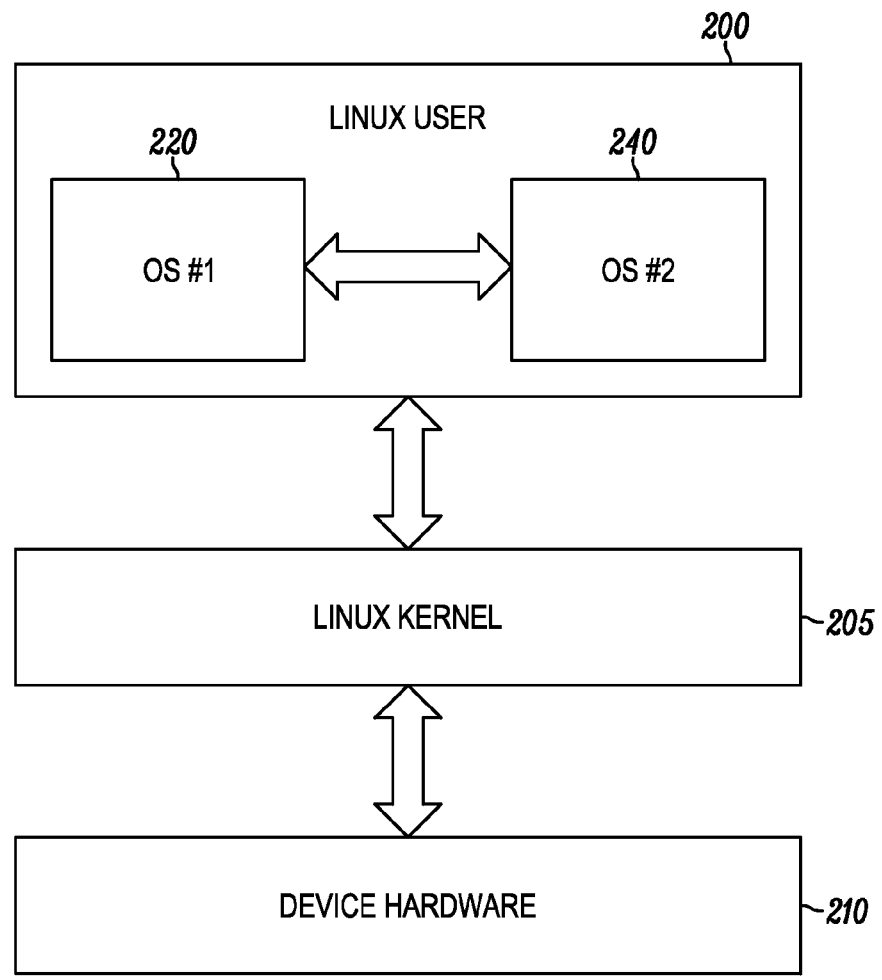
FIG. 2 is a block diagram representing an exemplary multi-operating environment.

Referring to FIG. 2, a block diagram is shown of an exemplary multi-operating environment 200 in communication with a solitary Linux kernel 205. The multi-operating environment can include a Linux distribution system, a Linux-based operating system or a non-Linux-based operating system. Device hardware 210, such as mobile telephones, mobile tablets, mobile communication devices, is also in communication with the Linux kernel 205. The multi-operating environment 200 includes a first middleware operating environment 220 and a second middleware operating environment 240 in communication with a single Linux kernel 205. By example, the second middleware operating system environment 240 is a standard Linux distribution (i.e., a computing operating environment) and the first middleware operating system environment 220 is an embedded operating environment intended for use in mobile devices, such as an Android™ operating system.

In one embodiment, a Linux distribution operating system 200 is in communication with the Linux kernel 205, which is in communication with the device hardware 210. The device hardware 210 can be a memory storage device (not shown) coupled to a processor (not shown) which stores computer executable instructions which are configured to perform various functions and operations, as described herein.

An exemplary operating system 200 includes Ubuntu® (Canonical Ltd., www.ubuntu.com) for the Linux-based middleware operating environment 240. It is specifically intended that multiple middleware operating system environments co-exist independent of the other(s). Exemplary environments that can be included in multi-operating environment 200 include Android™, Ubuntu®, standard Linux-based environments, Symbian, and Windows-based environments. In an alternative embodiment, it is envisioned that greater than two operating environments are configured to independently co-exist on the same core kernel 205. However, kernel 205 may be pardoned as well.

Figure 3:
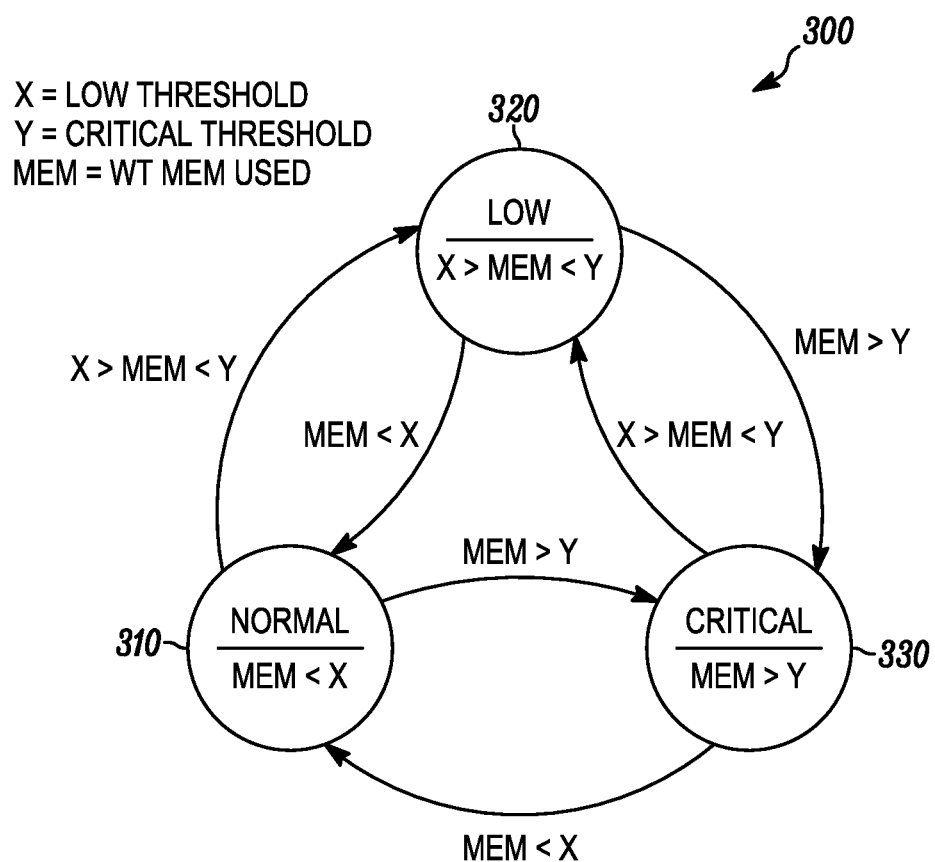
FIG. 3 is a bubble diagram identifying memory threshold decisions and functionality in an exemplary multi-operating environment.

Referring to FIG. 3, a bubble diagram 300 is shown that identifies memory threshold decisions and functionality in an exemplary multi-operating environment. Memory threshold is determined by realizing the amount of memory necessary to retain stability and functionality for a mobile communication device to operate reliably as though it was operating in a conventional stand-alone real time communication operating environment. Specifically, variable "x" is designated as low memory threshold and variable "y" is designated as critical memory threshold. Variable "mem" is designated as the computing environment memory that is currently being used. At initialization or start, the memory usage of the computing environment, such as Linux-based middleware operating environment 240 in FIG. 2 is below a low threshold and thus is considered to be within normal operating range at bubble 310 (i.e., mem<x). However, the usage of several applications at once can lead to increased memory usage that will approach bubble 320 (i.e., x>mem<y). When the memory usage crosses the low memory threshold associated with bubble 320 a warning on a graphical user interface for the computing environment (not shown) is displayed for the user. However, full computing functionality within the computing environment is still possible and accessible by the user.

As the user continues to draw upon memory resources by using additional applications and web browsers or web pages, for example, the memory usage will track towards critical at bubble 330 (i.e., mem>y). At this juncture, a warning on the graphical user interface for the computing environment is displayed and computing functionality is disabled while at the same time there remains limited telephony operational functionality within the mobile communicating operating environment (e.g., Android™ as a first middleware operating system environment 220 in FIG. 2). The limited telephony operational functionality can include text, inbound calls, outbound calls, notifications, and images.

The disabling of computing functionality in the computing environment can include restricting full web browser access or alternatively restricting partial web browser access by enabling selection of certain web pages to close. Moreover, the disabling of computing functionality will nevertheless allow the user to close windows or applications until at least the memory usage is once again below the low memory threshold (x). This exception to the disabled computing functionality can be accomplished by using a pop-up window, for example, that allows the user to exit applications and web browser tabs in order to free memory (i.e., gain additional unused memory), and also keep critical telephony functions.

With regard to what the user sees in the computing environment as computing functionality is disabled, one or more selectable icons are disabled or in the alternative an entire webpage can be "grayed-out". That is the webpage will have no functionality for the user when it is grayed out.

Figure 4A:
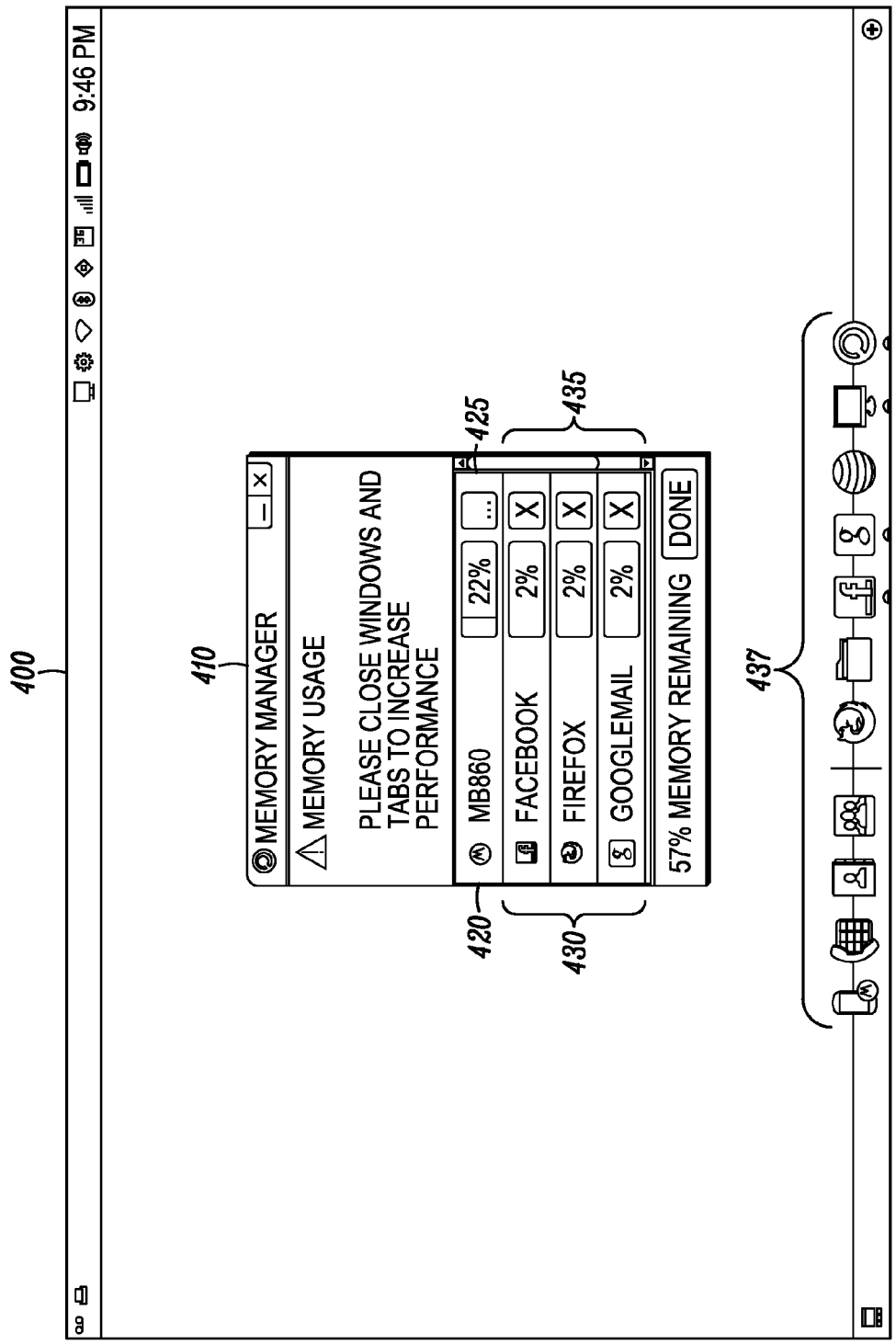
FIG. 4A shows an exemplary webscreen for a memory manager in one state.

Referring to FIG. 4A, an exemplary webscreen 400 is shown in normal state that includes a memory manager 410 under operation by a controller (not shown). Memory usage for the mobile communicating operating environment is displayed as entry 420. A selectable button or icon 425 is associated with the task manager for the mobile communicating operating environment. Other webscreens or windows that are currently open in webscreen 400 are entries 430. The entries 430 can include social networking webpages, web browsers, photo gallery websites, video replay websites, sporting websites, and email entities, for example. Selectable buttons or icons 425 enable a user to close these open webscreens or windows 435 that are displayed as entries 430. Selectable widgets 437 can also include social networking webpages, web browsers, photo gallery websites, video replay websites, sporting websites, and email entities, for example; along with telephony functions as well.

Figure 4B:
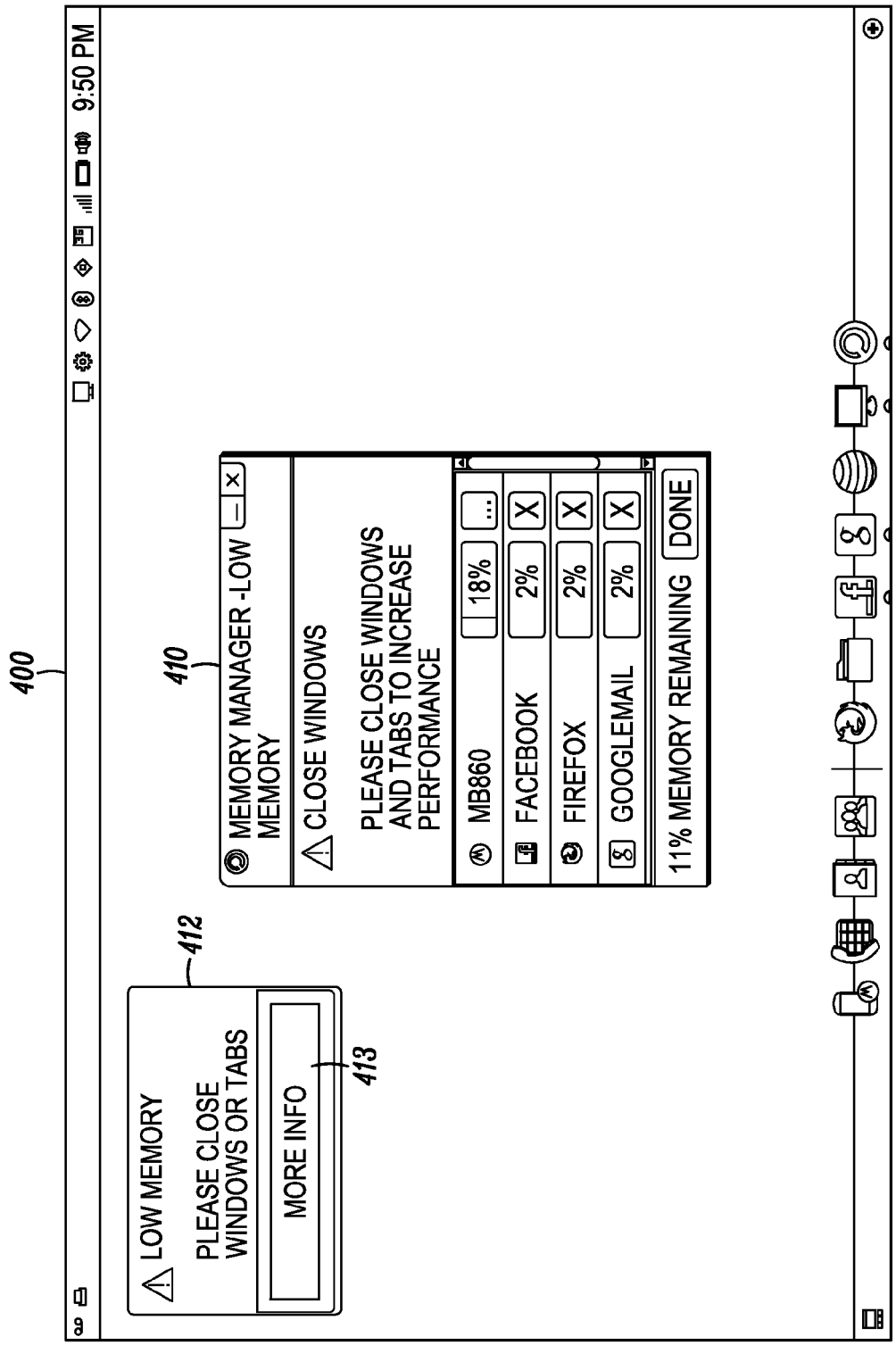
FIG. 4B shows an exemplary webscreen for a memory manager in another state.

Referring to FIG. 4B, memory manager 410 illustrates an exemplary low memory threshold condition as low memory notification 412. Low memory notification 412 remains on webscreen 400 until the low memory warning condition ceases. A "More Info" button or icon 413 can open a memory manager application that is in the warning mode.

Figure 4C:
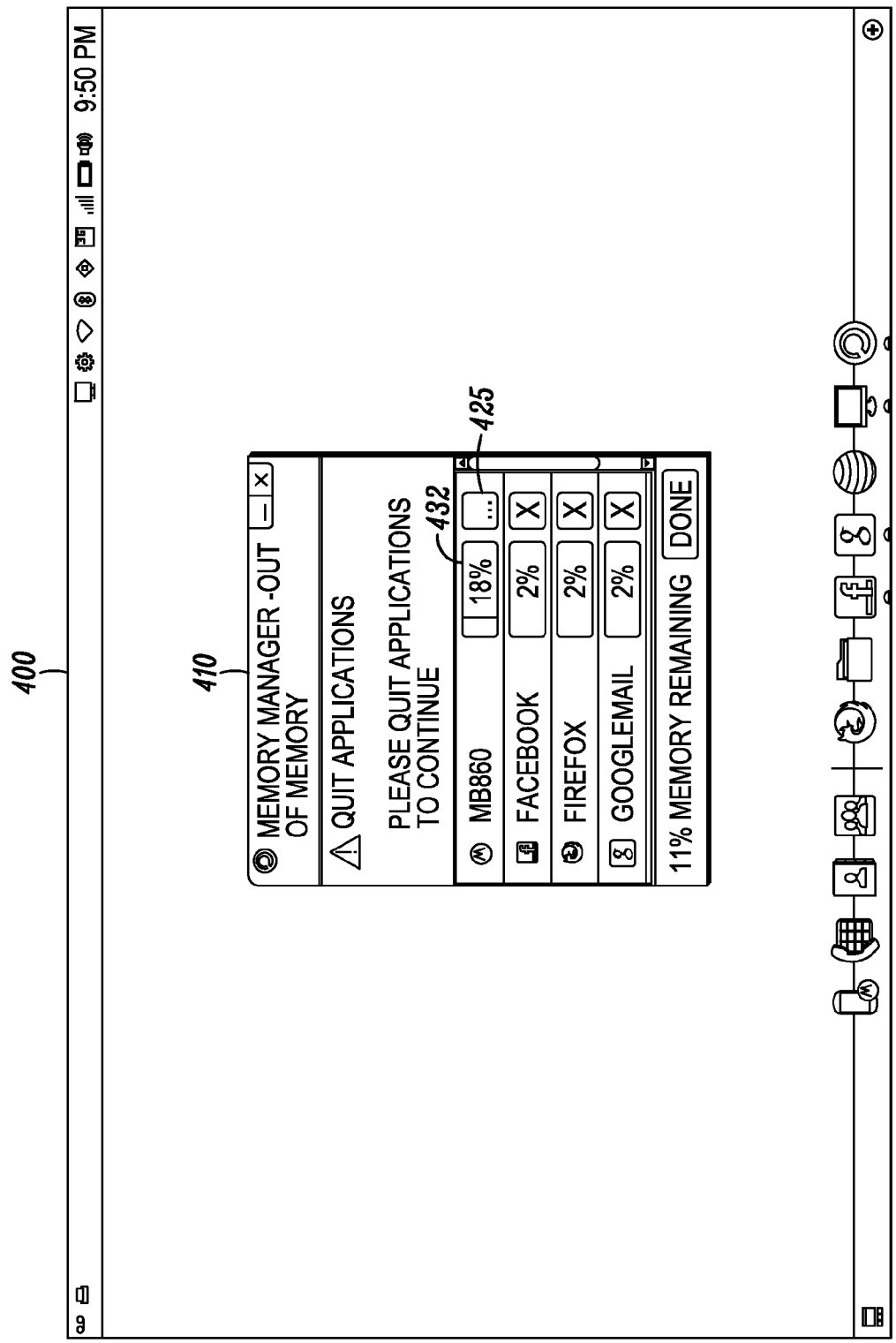
FIG. 4C shows an exemplary webscreen for a memory manager in yet another state.

Referring to FIG. 4C, memory manager 410 illustrates an exemplary critical memory threshold condition (i.e., where memory usage is nearly or substantially depleted). Webscreen 400 is "grayed out", thus only allowing a user to close memory draining entries 432 within the computing operating environment via buttons or icons 425. In addition, memory manager 410 restricts usage of the mouse or pointer and the keyboard for entering text. Thus, memory manager 410 prevents the user from doing anything other than closing open windows or applications in the computing environment. The only exception to this user restriction is when there is an urgent notification like an incoming call, alarm, or message, for example or when webscreen 400 is locked.

Figure 4D:
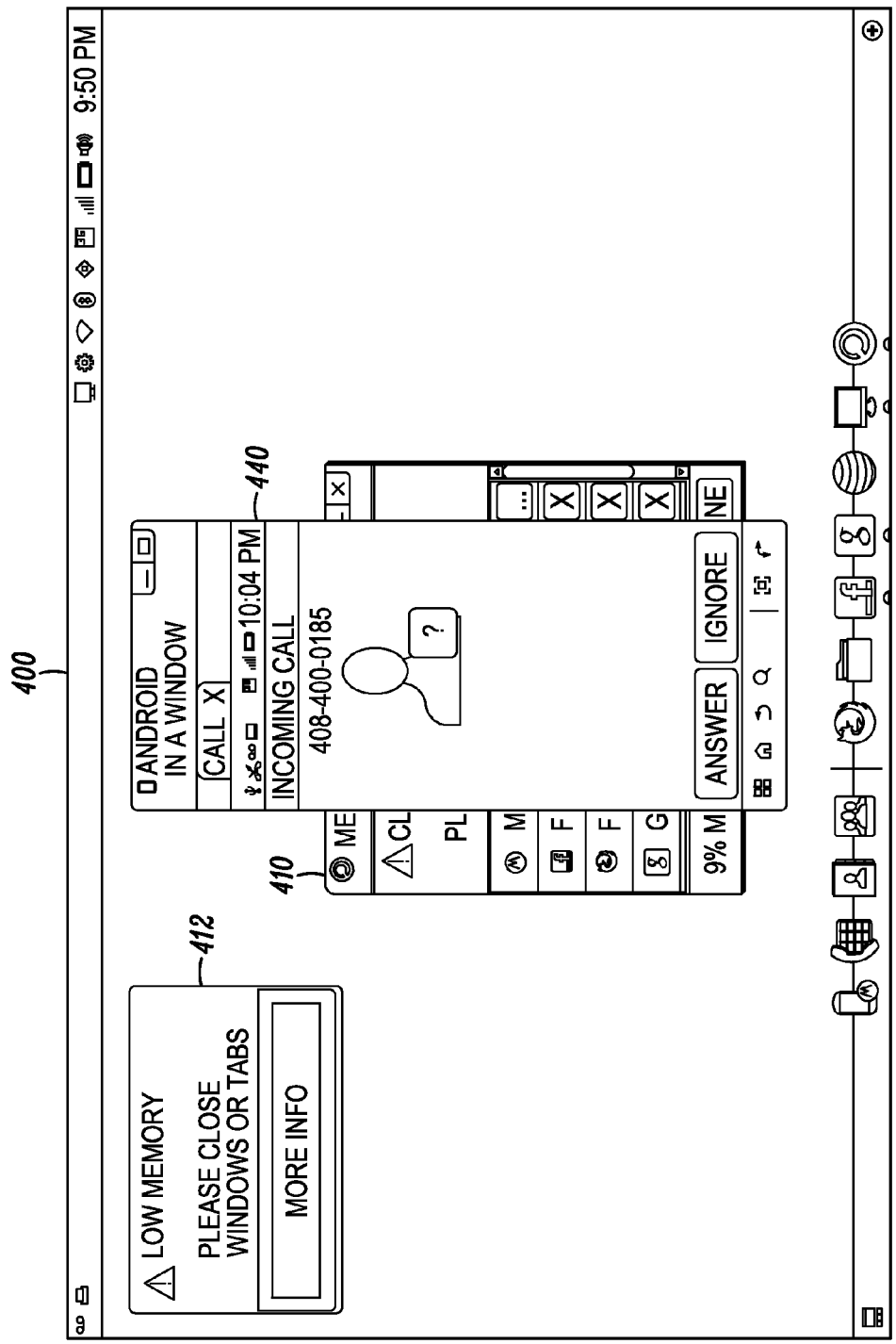
FIG. 4D shows an exemplary webscreen for a memory manager in same state as in FIG. 4C along with an exemplary notification.

Referring to FIG. 4D, memory manager 410 illustrates an exemplary critical memory threshold condition 412 (i.e., where memory usage is nearly or substantially depleted) and an urgent mobile communication notification window 440 (e.g., an incoming call, text, or image) within the mobile communication operating environment. During this juncture the computing functionality is severely or substantially limited; for example, automatic or manual selection for access or usage of memory draining web browser or specific tabs, select web pages, or windows within the memory draining web browser. However, the user may use either a mouse or keyboard to answer the phone call that is displayed in mobile communication notification window 440. Thereafter, once the call ends, memory manager 410 will further restrict computing functionality until the memory usage returns to below the critical memory threshold (y) as shown in FIG. 3.

Notably, the memory resources of the mobile communication device, i.e., mobile telephone or mobile tablet can also be tracked via a graphical user interface as shown in FIGS. 4A-4D. The user can select a button or icon to display the ongoing memory usage associated primarily with the mobile communication device.

This invention makes a mobile phone that is functioning in a multi-operating environment more stable and more reliable by preventing the user from opening additional windows or starting new applications when memory resources are critically low. This in turn, will help in making sure that the multi-operating environment doesn't crash or fail due to the lack of memory and the invention will also help in preventing missed calls that could inevitably arise in the event of system crash.

The present invention can be realized in hardware, software, or a combination of hardware and software. The present invention can be realized in a centralized fashion in one processing system or in a distributed fashion where different elements are spread across several interconnected processing systems. Any kind of processing system or other apparatus, such as a controller, can be adapted for carrying out the methods described herein. A combination of hardware and software within a processing system can include an application that when loaded and executed controls the processing system such that it carries out the methods described herein. The present invention also can be embedded in an application product, which comprises all the features enabling implementation of the methods described herein, and which when loaded in a processing system is able to carry out these methods.

The terms "computer program," "software," "application," variants and/or combinations thereof, in the present context, mean any expression, in any language, code or notation, of a set of instructions intended to cause a system having an information processing capability to perform a particular function either directly or after either or both of the following: a) conversion to another language, code or notation; b) reproduction in a different material form. For example, an application can include, but is not limited to, a subroutine, a function, a procedure, an object method, on object implementation, an executable application, an applet, a servlet, a source code, an object code, a shared library/dynamic load library and/or other sequence of instructions designed for execution on a processing system.

The terms "a" and "an" as used herein, are defined as one or more than one.

The term "plurality" as used herein, is defined as two as or more than two. The term "another" as used herein, is defined as at least a second or more. The terms "including" and/or "having" as used herein, are defined as comprising (i.e., open language).

It is specifically intended that the present invention not be limited to the embodiments and illustrations contained herein, but include modified forms of those embodiments including portions of the embodiments and combinations of elements of different embodiments as come within the scope of the following claims.

We claim:

1. A mobile device comprising:
a multi-environment system comprising:
at least two co-existing independent middleware operating environments that share memory resources of the mobile device and a single operating system kernel;
a graphical user interface for each of the co-existing independent middleware operating environments; and
a controller configured to:
monitor the memory resources used by the at least two co-existing independent middleware operating environments,
determine one or more memory threshold levels for the memory resources in order to retain telephony operations for the mobile device as the memory resources become depleted, and
manage one or more applications executed in each of the at least two co-existing independent middleware operating environments to keep the used memory resources below the determined one or more memory threshold levels.

2. The mobile device according to claim 1, wherein the at least two co-existing independent middleware operating environments comprise a mobile device operating environment and a computing operating environment.

3. The mobile device according to claim 2 further comprising limiting computing functionality in the computing environment.

4. The mobile device according to claim 3, wherein the computing functionality is limited by restricting full web browser access.

5. The mobile device according to claim 3, wherein the computing functionality is limited by restricting partial web browser access corresponding to select web pages.

6. The mobile device according to claim 1, wherein the single operating system kernel is a Linux kernel.

7. The mobile device of claim 1, wherein the one or more memory thresholds includes a low memory threshold.

8. The mobile device of claim 7, wherein the controller is further configured to: control a display of a warning on the graphical user interface for at least one of the graphical user interface for the co-existing independent middleware operating environments, and disable computing functionality while maintaining telephony operational functionality.

9. A web-based multi-environment system, comprising:
at least one mobile telephone operating environment;
at least one computing operating environment that is independent of the at least one mobile telephone operating environment;
a single operating system kernel that is shared by the at least one computing operating environment and the at least one mobile telephone operating environment;
a graphical user interface for the mobile telephone operating environment;
a graphical user interface for the computing operating environment; and
a controller configured to:
monitor memory resources shared by the at least one computing operating environment and the at least one mobile telephone operating environment,
determine one or more memory threshold levels for the memory resources in order to retain telephony operations for the mobile device as the memory resources become depleted, and
manage one or more applications executed in each of the at least one computing operating environment and the at least one mobile telephone operating environment to keep the used memory resources below the determined one or more memory threshold levels.

10. The web-based multi-environment system according to claim 9 further comprising limiting computing functionality in the at least one computing operating environment.

11. The web-based multi-environment system according to claim 10, wherein the computing functionality is limited by restricting full web browser access.

12. The web-based multi-environment system according to claim 10, wherein the computing functionality is limited by restricting partial web browser access corresponding to select web pages.

13. The web-based multi-environment system of claim 9, wherein the one or more memory thresholds includes a low memory threshold.

14. The web-based multi-environment system of claim 13, wherein the controller is further configured to: control a display of a warning on the graphical user interface for the graphical user interface for the at least one computing operating environment, and disable computing functionality while maintaining telephony operational functionality within the at least one mobile telephone operating environment.

* * * * *